United States Patent
He et al.

(10) Patent No.: US 10,590,333 B2
(45) Date of Patent: *Mar. 17, 2020

(54) CATIONIC MULTIPLE QUATERNARY AMMONIUM-BASED SURFACTANTS FOR ENHANCING PRODUCTION IN SUBTERRANEAN FORMATIONS

(71) Applicant: Multi-Chem Group, LLC, San Angelo, TX (US)

(72) Inventors: Kai He, Kingwood, TX (US); Funian Zhao, Tomball, TX (US); Liangwei Qu, Spring, TX (US); Liang Xu, Houston, TX (US)

(73) Assignee: Multi-Chem Group, LLC, Houston, TX (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/527,769

(22) PCT Filed: Dec. 22, 2014

(86) PCT No.: PCT/US2014/071862
§ 371 (c)(1),
(2) Date: May 18, 2017

(87) PCT Pub. No.: WO2016/105338
PCT Pub. Date: Jun. 30, 2016

(65) Prior Publication Data
US 2017/0327732 A1    Nov. 16, 2017

(51) Int. Cl.
*C09K 8/584* (2006.01)
*C09K 8/68* (2006.01)
*C09K 8/60* (2006.01)

(52) U.S. Cl.
CPC ............... *C09K 8/68* (2013.01); *C09K 8/584* (2013.01); *C09K 8/602* (2013.01)

(58) Field of Classification Search
CPC ...... C09K 8/68; C09K 2208/30; C09K 8/602; C09K 8/604; C09K 8/035; C09K 8/36; C09K 8/584; C09K 8/62; C09K 8/86; C09K 8/703; C09K 8/40; C09K 8/52; C09K 8/588; C09K 8/72; C09K 8/74; C09K 2208/08; C09K 8/12; C09K 8/28; C09K 8/38; C09K 8/94; C09K 2208/28; C09K 8/88; C09K 8/885; C09K 2208/32; C09K 3/1463; C09K 8/42; C09K 8/524; C09K 8/536; C09K 8/594; C09K 8/60; C09K 8/80; C09K 2208/22; C09K 8/00; C09K 8/03; C09K 8/06; C09K 8/26; C09K 8/487; C09K 8/502; C09K 8/506; C09K 8/514; C09K 8/665; C09K 8/70; C09K 8/82; E21B 43/26; E21B 43/267; E21B 43/16; E21B 21/003; E21B 33/13; E21B 41/02; E21B 43/25
See application file for complete search history.

(56) References Cited

U.S. PATENT DOCUMENTS

| | | | |
|---|---|---|---|
| 6,358,914 B1 | 3/2002 | Gabriel et al. | |
| 10,106,721 B2 * | 10/2018 | Yue | C09K 8/035 |
| 2006/0013798 A1 * | 1/2006 | Henry | A61K 31/785 424/78.09 |
| 2006/0178277 A1 | 8/2006 | Allan et al. | |
| 2008/0257551 A1 | 10/2008 | Morris | |
| 2009/0023616 A1 | 1/2009 | Couillet et al. | |
| 2010/0285999 A1 * | 11/2010 | Norman | C09K 8/52 507/240 |

OTHER PUBLICATIONS

Chlebicki et al, Surface-active, micellar, and antielectrostatic properties of bis-ammonium salts, Journal of Colloid and Interface Science 323 (2008) 372-378).*
https://en.wikipedia.org/wiki/Injection_well downloaded on Nov. 2, 2018.*
Chlebicki et al, Preparation, surface-active properties, and antimicrobial activities of bis-quaternary ammonium salts from amines and epichlorohydrin, Journal of Surfactants and detergents, 2005, 8, 227-232.*
oilfield. slb.com/Terms/u/unconventional_resource.aspx downloaded on Nov. 2, 2018.*
International Preliminary Report on Patentability issued in related Application No. PCT/US2014/071862, dated Jul. 6, 2017 (9 pages).
Huskens, Jurriaan. "Multivalent interactions at interfaces." Current opinion in chemical biology 10.6 (2006): 537-543.
Kelland, Malcolm A. "History of the development of low dosage hydrate inhibitors." Energy & Fuels 20.3 (2006): 825-847.
International Search Report and Written Opinion issued in related PCT Application No. PCT/US2014/071862 dated Aug. 25, 2015, 12 pages.

* cited by examiner

*Primary Examiner* — Kumar R Bhushan
(74) *Attorney, Agent, or Firm* — Tenley Krueger; Baker Botts L.L.P.

(57) ABSTRACT

Surfactant compositions for enhancing oil and/or gas production from certain subterranean formations (e.g., unconventional reservoirs), and related methods of use, are provided. In one embodiment, the methods comprise: providing a treatment fluid comprising a carrier fluid and a cationic surfactant comprising at least two hydrophobic heads that each comprise a quaternary cationic moiety; and introducing the treatment fluid into at least a portion of a subterranean formation.

9 Claims, 4 Drawing Sheets

CATIONIC MULTIPLE QUATERNARY AMMONIUM-BASED SURFACTANTS FOR ENHANCING PRODUCTION IN SUBTERRANEAN FORMATIONS

CROSS-REFERENCE TO RELATED APPLICATION

The present application is a U.S. National Stage Application of International Application No. PCT/US2014/071862 filed Dec. 22, 2014, which is incorporated herein by reference in its entirety for all purposes.

BACKGROUND

The present disclosure relates to compositions and methods for treating subterranean formations.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore and cemented into place. Thereafter, one or more treatments may be performed in the subterranean formation and/or the well bore to facilitate the production of hydrocarbons such as gas and oil from the well, such as enhanced oil recovery operations, stimulation treatments (e.g., hydraulic fracturing), and the like. For example, an enhanced oil recovery operation is a generic term for techniques for increasing the amount of crude oil that can be extracted from a hydrocarbon-producing formation (e.g., hydrocarbon reservoirs). Such operations can be particularly useful in unconventional reservoirs (e.g., shale) where the extraction of such hydrocarbons may not be facilitated by natural buoyant forces.

In some instances, enhanced oil recovery may be achieved by gas injection, foam injection, chemical injection, microbial injection, or thermal recovery (which includes cyclic or continuous steam, steam flooding, and fire flooding). In certain of these treatments, fluid is injected into the reservoir to displace or sweep the hydrocarbons out of the reservoir. In order to accomplish this more effectively, one or more surfactants or emulsifiers may be injected into the formation, among other reasons, to lower the interfacial tension between oil and water which allows stable emulsions with small drops to be formed that can be carried out of the formation with the fluid. Many variables may affect the selection of a surfactant for use in such treatments and operations, such as interfacial surface tension, wettability, compatibility with other additives (such as other additives used in acidizing treatments), and emulsification tendency.

However, the composition, porosity, and/or permeability of a subterranean formation and the composition of formation fluids may complicate these treatments. For example, in some instances, large amounts of the surfactant and/or emulsifier may become adsorbed onto rock surfaces in the formation before they can effectively dissolve and/or emulsify the oil in the formation. In these cases, large amounts of surfactant may be needed so that a sufficient amount remains in the fluid to reduce interfacial tension between the oil and water. In many cases, the composition, porosity, and/or permeability of a subterranean formation may vary in different regions thereof, which may make the effective treatment of the entire formation with one type of treatment impractical or difficult.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

The present disclosure relates to compositions and methods for treating subterranean formations. More particularly, the present disclosure relates to surfactant compositions for enhancing oil and/or gas production from certain subterranean formations (e.g., unconventional reservoirs) and related methods of use.

The present disclosure provides a cationic ammonium-based surfactant that comprises at least two hydrophilic heads. The hydrophilic heads in the cationic surfactants of the present disclosure each comprise a quaternary cationic moiety (e.g., a quaternary ammonium moiety and/or a quaternary phosphonium moiety), which may be referred to herein as a "quat moiety" or alternatively as a "quat." Because the cationic surfactants of the present disclosure generally comprise multiple quats, they may be referred to herein alternatively as a "multiple quat," a "multi-quat," a "multiple quaternary ammonium compound," or a "multiple quaternary phosphonium compound." The cationic surfactants of the present disclosure may be introduced into at least a portion of a subterranean formation (for example, as a component of a treatment fluid that is pumped or injected into a subterranean formation) in the course of one or more treatments therein. In certain embodiments, the surfactants of the present disclosure may be included in a treatment fluid (e.g., a pad fluid and/or fracturing fluid) that is introduced into a formation in the course of one or more stimulation treatments (such as fracturing treatments, acidizing treatments, etc.) or an enhanced oil recovery operation.

Among the many potential advantages to the methods and compositions of the present disclosure, only some of which are alluded to herein, the methods, compositions, and systems of the present disclosure may facilitate the recovery and/or production of oil and/or gas out of certain subterranean formations. Without limiting the disclosure to any particular theory or mechanism, it is believed that, in certain embodiments, the surfactants of the present disclosure may interact with acidic compounds in crude oil in a subterranean formation more effectively, which may allow those surfactants to dissolve more oil and reduce its viscosity, among other reasons, to facilitate the production of that oil out of the formation. In certain embodiments, the surfactants of the present disclosure may adsorb onto positively-charged rock surfaces (e.g., carbonate) in a subterranean formation less as compared to other surfactants, which may allow the surfactants of the present disclosure to more effectively interact with oil in the formation. In certain embodiments, the surfactants of the present disclosure may be synthesized at a relatively low cost as compared to other surfactants used in subterranean treatments.

In certain embodiments, these surfactants have following the general formula:

wherein each of $R^1$, $R^2$, and $R^3$ may be any suitable moiety that maintains the hydrophilic nature of the quat moiety to which each of $R^1$, $R^2$, and $R^3$ is attached, each of X and X' is an anion selected from the group consisting of halide, carboxylate, sulfate, organic sulfonate, hydroxide, and combinations thereof; and R may be any suitable moiety of sufficient length and composition to retain lipophilic and/or hydrophobic properties.

In various embodiments of surfactants according to the general formula above, each R-group of the quaternary moieties may be either the same or different with respect to the others. In some embodiments, each of $R^1$ and $R^2$ and $R^3$ may comprise an organic moiety such as any one or more of: alkyl, alkenyl, alkynyl, aryl, arylalkyl, arylalkenyl, alkylaryl, alkenylaryl, glycol, and combinations thereof. Each of $R^1$, $R^2$, and $R^3$ may be substituted or unsubstituted, and/or branched or unbranched, and/or cyclic or non-cyclic, and/or saturated or unsaturated. In certain embodiments, each of these R-groups may comprise approximately 1 to 20 carbon atoms. That is, each R-group may be a $C_1$ to $C_{20}$ hydrocarbon chain. In particular embodiments, each R-group may be a $C_1$ to $C_{18}$ hydrocarbon chain. In particular embodiments, each R-group may be a $C_1$ to $C_{12}$ hydrocarbon chain. In particular embodiments, each R-group may be a $C_1$ to $C_8$ hydrocarbon chain. As used herein, a "hydrocarbon chain" may, unless otherwise specifically noted, be substituted or unsubstituted (that is, it may or may not contain one or more additional moieties or functional groups in place of one or more hydrogens in the hydrocarbon chain); it may be branched, unbranched, acyclic, and/or cyclic; and/or it may be saturated or unsaturated. Furthermore, as used herein, the nomenclature "$C_x$ to $C_y$" refers to the number of carbon atoms in the hydrocarbon chain (here, ranging from x to y carbon atoms). Thus, an R-group of some embodiments may comprise a $C_1$ to $C_{10}$ alkyl chain (branched or unbranched), or in other embodiments a $C_1$ to $C_6$ alkyl, alkenyl, or alkynyl chain (branched or unbranched), or in yet other embodiments a $C_1$ to $C_8$ alkyl, alkenyl, or alkynyl chain (branched or unbranched). Similarly, an R-group may comprise a $C_3$ to $C_{10}$ aryl moiety (and likewise for $C_1$ to $C_6$ moieties). Some embodiments may include R-groups of variously sized hydrocarbon chains, such as a hydrocarbon chain having as few as any one of: 1, 2, 3, 4, 5, 6, 7, 8, 9, and 10 carbon atoms; and as many as any one of: 2, 3, 4, 5, 6, 7, 8, 9, 10, 11, 12, 13, 14, 15, 16, 17, 18, 19, and 20 carbon atoms. As noted, an R-group according to some embodiments may include other groups in addition to the hydrocarbon groups described above (e.g., it may include a substituted hydrocarbon chain), so long as the quat moiety remains hydrophilic. An R-group of any quat moiety of a compound according to some embodiments may be smaller than a lipophilic tail of such compound.

The quaternary moieties in the surfactants of the present disclosure may be isomeric and/or stereoisomeric with respect to each other (that is, each of two or more quats may be of the general structure $R^1R^2R^3N^+$— with each R-group as described above, or each of two or more quats may be of the general structure —$R^1R^2N^+$— when incorporated into the middle of the compound). In some embodiments, any one or more quat moieties may include a different set of R-groups (e.g., a set of R-groups whose identities are only partially overlapping or entirely non-overlapping with respect to the identities of R-groups of another quat moiety). Thus, taking for example the case with entirely non-overlapping R-groups, some embodiments may comprise a first quat moiety having general structure $R^1R^2R^3N^+$— and a second quat moiety having general structure $R^4R^5R^6N^+$—, where each of $R^4$, $R^5$, and $R^6$ may have a general structure according to the principles discussed above with respect to R-groups $R^1$, $R^2$, and $R^3$.

In other embodiments, the surfactants of the present disclosure may have formulae similar to those discussed herein except that the nitrogen atoms are replaced with phosphorus atoms.

In certain embodiments, the cationic surfactants according to the present disclosure may comprise at least one lipophilic tail. The tail may be of sufficient length and composition to retain lipophilic and/or hydrophobic properties. By way of example, the tail of some embodiments may comprise any hydrocarbon chain (e.g., a $C_3$ to $C_{50}$ hydrocarbon chain, or a $C_8$ to $C_{30}$ hydrocarbon chain). In certain embodiments, the length of the lipophilic tail may be tailored to particular applications and conditions in a formation. In embodiments where the lipophilic tail comprises a hydrocarbon chain, that chain may be unsubstituted or substituted, and/or branched or unbranched, and/or saturated or unsaturated. It may comprise any one or more of alkyl, alkenyl, alkynyl, and aryl groups, and/or combinations thereof. As noted, the chain may optionally be substituted with any one or more additional groups, but such substituted additional group or groups should not alter the lipophilic and/or hydrophobic nature of the tail. In certain embodiments, the cationic surfactants of the present disclosure may include exactly one lipophilic tail. In certain other embodiments, the compound may include hydrophilic heads and tails in a ratio of 2 or more hydrophilic heads for every 1 lipophilic tail. The ratio of particular embodiments may be 3 hydrophilic heads to 1 lipophilic tail.

The cationic surfactants according to some embodiments of the present disclosure may instead or in addition be characterized and/or provided as reaction products. For example, the present disclosure in some embodiments provides a compound that may be characterized as the reaction product of the following series of reactions: (1) the reaction product of one mole of a long-chain primary amine and 2 moles of an epihalohydrin; and (2) the reaction product of reaction (1) with 2 moles of a tertiary amine. Put another way, compounds of such embodiments may be characterized as the product of a two-step reaction: (1) R—$NH_2$+2[epihalohydrin]; and (2) [product of reaction (1)]+2 $R^1R^2R^3N$.

The epihalohydrin may comprise epichlorohydrin, epibromohydrin, epifluorohydrin, epiiodohydrin, or any combination thereof.

In this scheme, the resultant product may include organic moiety R of the long-chain primary amine as lipophilic tail R; thus, the possible identities of organic moiety R may be the same as previously discussed with respect to lipophilic tail R (notwithstanding the moniker "long-chain," which is not intended to imply that a particular structure of R is required in any embodiment, other than as discussed previously with respect to lipophilic tail R as seen in various embodiments). Specific examples of suitable long-chain primary amine include cocoamine, tallow amine, oleyl amine, stearyl amine, lauryl amine, combinations of any two or more of the foregoing, and other long-chain primary amines having organic moiety R with characteristics in accordance with the lipophilic tail R discussed above (as well as combinations thereof). Similarly, R-groups $R^1$, $R^2$, and $R^3$ of the tertiary amine (and/or phosphine) may be in accordance with those R-groups previously discussed with respect to quaternary cations. In yet further embodiments, however, a secondary amine may be used instead of or in addition to tertiary amine in the second reaction step. In such instances, one of R-groups $R^1$, $R^2$, and $R^3$ is H, and the resultant product may still include multiple quaternary ammonium cations, although it may instead include multiple tertiary ammonium cations, and/or a mixture of tertiary and quaternary ammonium cations. Specific examples of suitable secondary and/or tertiary amine $R^1R^2R^3N$ for use in the second step of reaction may therefore include dimethylcocoamine, triethylamine, tripropylamine, tributylamine, tripentylamine, N,N-dimethylaniline, N,N-diethylaniline, dimethylisopropaneamine, dimethylbutylamine, dipropylamine, and combinations thereof. The ultimate reaction product may accordingly include multiple quat moieties (and/or tertiary ammonium cation moieties to the extent secondary amines are used in reaction), each having general structure $R^1R^2R^3N$— (where each of $R^1$, $R^2$, and $R^3$ may be an R-group in accordance with those discussed previously, and/or one of $R^1$, $R^2$, and $R^3$ may be H).

Particular embodiments may provide the reaction product of a synthesis method according to the foregoing, except using (i) a long-tail primary phosphine in place of the long-tail primary amine, and (ii) a secondary or tertiary phosphine in place of the secondary or tertiary amine. And in yet other embodiments, a combination of long-tail primary phosphine and long-tail primary amine may be used in the first reaction step, and a combination of (i) secondary or tertiary phosphine and (ii) secondary or tertiary amine may be used in the second reaction step.

Figure 1:
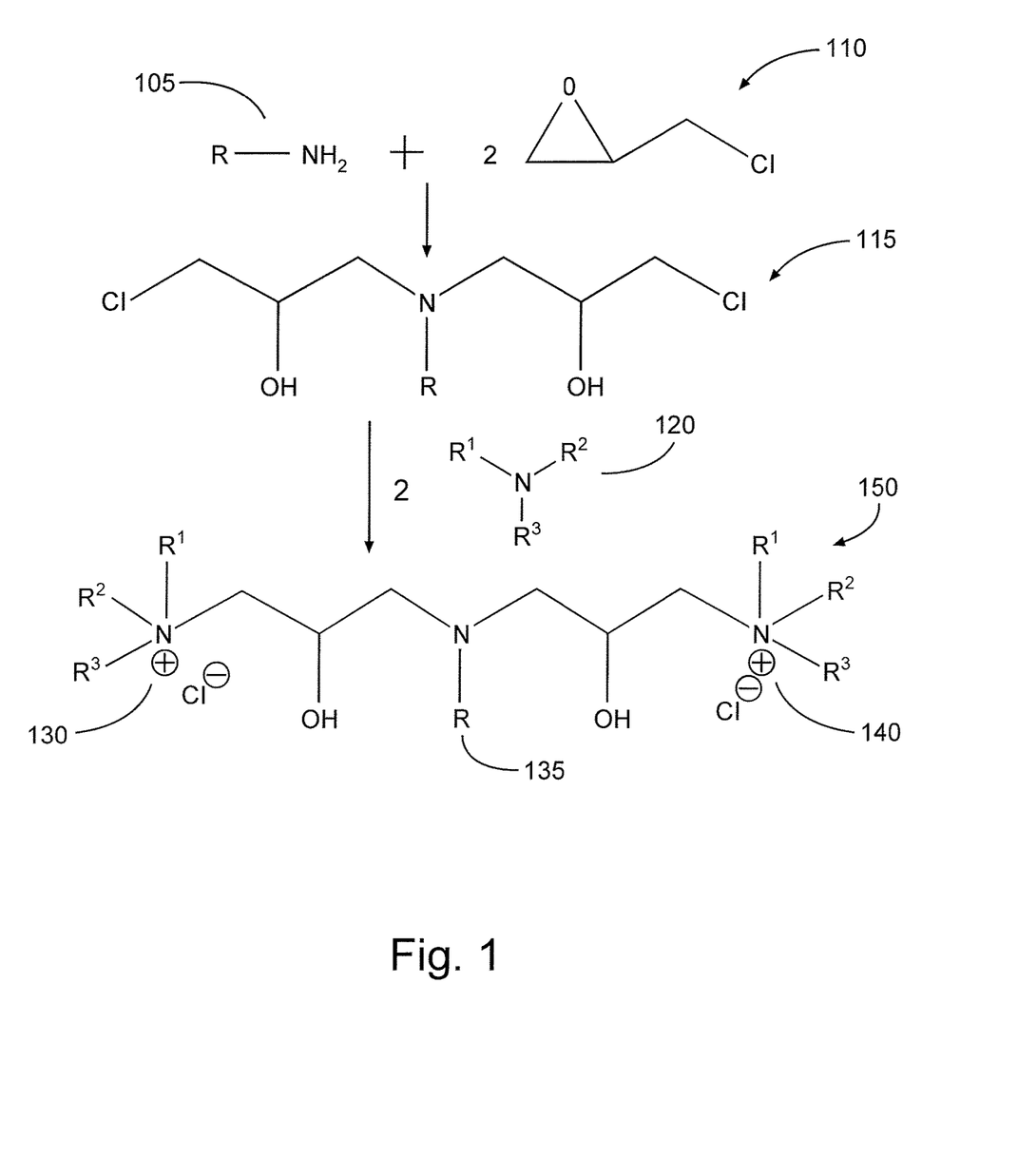
FIG. 1 is a diagram illustrating the synthesis of a cationic surfactant in accordance with one embodiment of the present disclosure.

FIG. 1 illustrates an example process of synthesizing one embodiment of a cationic surfactant of the present disclosure. Referring now to FIG. 1, 1 mole of primary amine 105 reacts with 2 moles epihalohydrin 110 (shown in FIG. 1 as epichlorohydrin). The product 115 of this reaction is then in turn reacted with 2 moles of a tertiary amine 120 (as noted previously, this could be replaced by any of: secondary amine, secondary phosphine, tertiary amine, tertiary phosphine, and combinations thereof), yielding a compound 150 comprising two hydrophilic heads (130, 140) which may be used as a surfactant of the present disclosure.

As shown in FIG. 1, the cationic moieties 130 and 140 of compound 150 are each associated (e.g., ionically bonded or otherwise associated) with chloride ions, making compound 150 a quaternary ammonium salt. Such salts may wholly or partially dissociate in aqueous or oligeous solution and/or solvents, and/or such salts may associate with different anions. It will further be appreciated by one of ordinary skill in the art with the benefit of this disclosure that salts may initially be formed with other anions instead of or in addition to chloride anions. For instance, suitable anions may comprise any one or more of hydroxide, carboxylate, halide, sulfate, organic sulfonate, and combinations thereof. Accordingly, when a compound comprising cationic moieties is referred to herein, it should be understood that such reference may alternately include both the salt form and the dissociated form (that is, having at least one cationic moiety not associated with an anion) of the compound, unless specifically noted otherwise. Compound 150 also includes a lipophilic tail 135.

The treatment fluids used in the methods, compositions, and systems of the present disclosure may comprise any carrier fluid known in the art, including aqueous-based fluids, non-aqueous fluids, and any combinations thereof. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

The one or more surfactant(s) of the present disclosure may be present in a treatment fluid in any suitable amount. For example, in some embodiments, a cationic surfactant of the present disclosure may be present in the treatment fluid in an amount of from about 100 parts per million to about 100,000 parts per million (ppm) of the treatment fluid by volume. In certain embodiments, a cationic surfactant of the present disclosure may be present in the treatment fluid in an amount of about 18,000 ppm. In certain embodiments, a cationic surfactant of the present disclosure may be present in the treatment fluid in an amount of about 1000 ppm. In certain embodiments, a cationic surfactant of the present disclosure may be present in the treatment fluid in an amount of about 250 ppm.

In certain embodiments, the treatment fluids used in the methods, compositions, and systems of the present disclosure optionally may comprise any number of additional additives. Examples of such additional additives include, but are not limited to, salts, additional surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. For example, in certain embodiments, a cationic surfactant of the present disclosure may be used in conjunction with (e.g., in the same treatment fluid as) one or more additional surfactants, which may include additional cationic surfactants, nonionic surfactants, or any suitable combination thereof. A person skilled in the art, with the benefit of this disclosure, will recognize the types of additives such as additional surfactants that may be included in the fluids of the present disclosure for a particular application (based on, for example, the rock composition of the subterranean formation in which they are used and/or the composition of hydrocarbons residing therein).

The treatment fluids of the present disclosure may be prepared by any suitable method. In some embodiments, the treatment fluids may be prepared on the job site or at an offsite location. As an example of such an on-site method, the cationic surfactants of the present disclosure and/or optional additional components may be added to the treatment fluid (e.g., a hydraulic fracturing fluid) during pumping. either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. Furthermore, additional additives, as discussed above, may be combined with the treatment fluid and/or the aqueous fluid as desired. For example, a particulate additive (e.g., a particulate scale inhibitor) or particulates (e.g., gravel particulates or proppant particulates) may be suspended in the treatment fluid.

The present disclosure in some embodiments provides methods for using the treatment fluids to carry out a variety of subterranean treatments, including but not limited to, enhanced oil recovery operations, stimulation treatments (e.g., hydraulic fracturing treatments, acidizing treatments), drilling operations, and the like. In certain embodiments, a treatment fluid of the present disclosure may be introduced into a subterranean formation where one or more hydrocarbons reside. In some embodiments, the treatment fluid may be introduced into a well bore that penetrates a subterranean formation, which may include a well through which hydrocarbons are to be produced (e.g., a producing well), or a separate injection well that penetrates at least a portion of the same subterranean formation as a well through which hydrocarbons are to be produced. In either instance, at least a portion of the hydrocarbons in the formation may become dissolved in the treatment fluid and may flow out of the subterranean formation with at least a portion of the treatment fluid.

In some embodiments, the treatment fluid may be introduced at a pressure sufficient to create or enhance one or more fractures within the subterranean formation (e.g., hydraulic fracturing). The embodiments of the present disclosure may be well suited for unconventional formations including but not limited to shale formations (e.g., Eagleford, Barnett, Bakken, Wolfcamp and Woodfood, etc.) In certain embodiments, "unconventional formations" may include low permeability and low porosity, tight rock formations. These unconventional formations typically have a higher surface area than other subterranean formations which leads to a greater potential for the adsorption of the surfactant.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 2, the disclosed methods and compositions may directly or indirectly affect one or more components or pieces of equipment associated with an exemplary fracturing system 200, according to one or more embodiments. In certain instances, the system 200 includes a fracturing fluid producing apparatus 220, a fluid source 230, a proppant source 240, and a pump and blender system 250 and resides at the surface at a well site where a well 260 is located. In certain instances, the fracturing fluid producing apparatus 220 combines a gel pre-cursor with fluid (e.g., liquid or substantially liquid) from fluid source 230, to produce a hydrated fracturing fluid that is used to fracture the formation. The hydrated fracturing fluid can be a fluid for ready use in a fracture stimulation treatment of the well 260 or a concentrate to which additional fluid is added prior to use in a fracture stimulation of the well 260. In other instances, the fracturing fluid producing apparatus 220 can be omitted and the fracturing fluid sourced directly from the fluid source 230. In certain instances, the fracturing fluid may comprise water, a hydrocarbon fluid, a polymer gel, foam, air, wet gases and/or other fluids.

Figure 2:
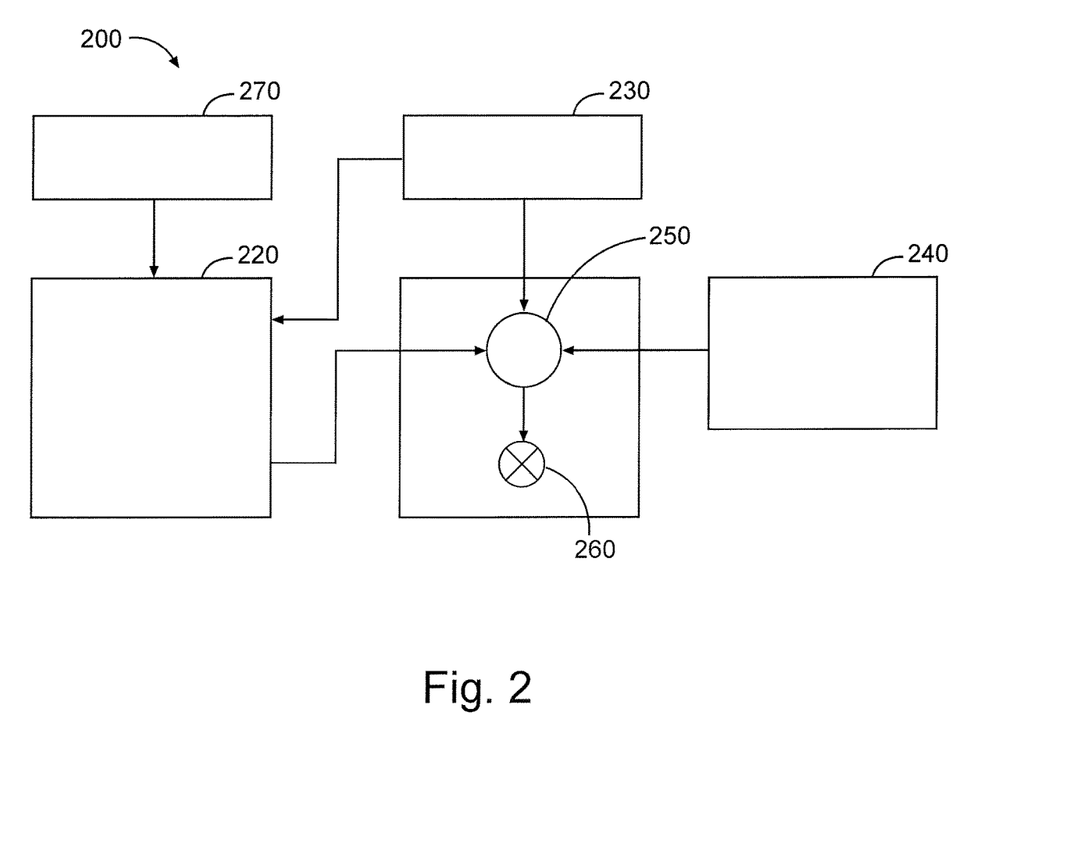
FIG. 2 is a diagram illustrating an example of a fracturing system that may be used in accordance with certain embodiments of the present disclosure.

The proppant source 240 can include a proppant for combination with the fracturing fluid. The system may also include additive source 270 that provides one or more additives (e.g., gelling agents, weighting agents, cationic surfactants of the present disclosure, and/or other optional additives) to alter the properties of the fracturing fluid. For example, the other additives can be included to reduce pumping friction, to reduce or eliminate the fluid's reaction to the geological formation in which the well is formed, to operate as surfactants, and/or to serve other functions.

The pump and blender system 250 receives the fracturing fluid and combines it with other components, including proppant from the proppant source 240 and/or additional fluid from the additives. The resulting mixture may be pumped down the well 260 under a pressure sufficient to create or enhance one or more fractures in a subterranean zone, for example, to stimulate production of fluids from the zone. Notably, in certain instances, the fracturing fluid producing apparatus 220, fluid source 230, and/or proppant source 240 may be equipped with one or more metering devices (not shown) to control the flow of fluids, proppants, and/or other compositions to the pumping and blender system 250. Such metering devices may permit the pumping and blender system 250 can source from one, some or all of the different sources at a given time, and may facilitate the preparation of fracturing fluids in accordance with the present disclosure using continuous mixing or "on-the-fly" methods. Thus, for example, the pumping and blender system 250 can provide just fracturing fluid into the well at some times, just proppants at other times, and combinations of those components at yet other times.

Figure 3:
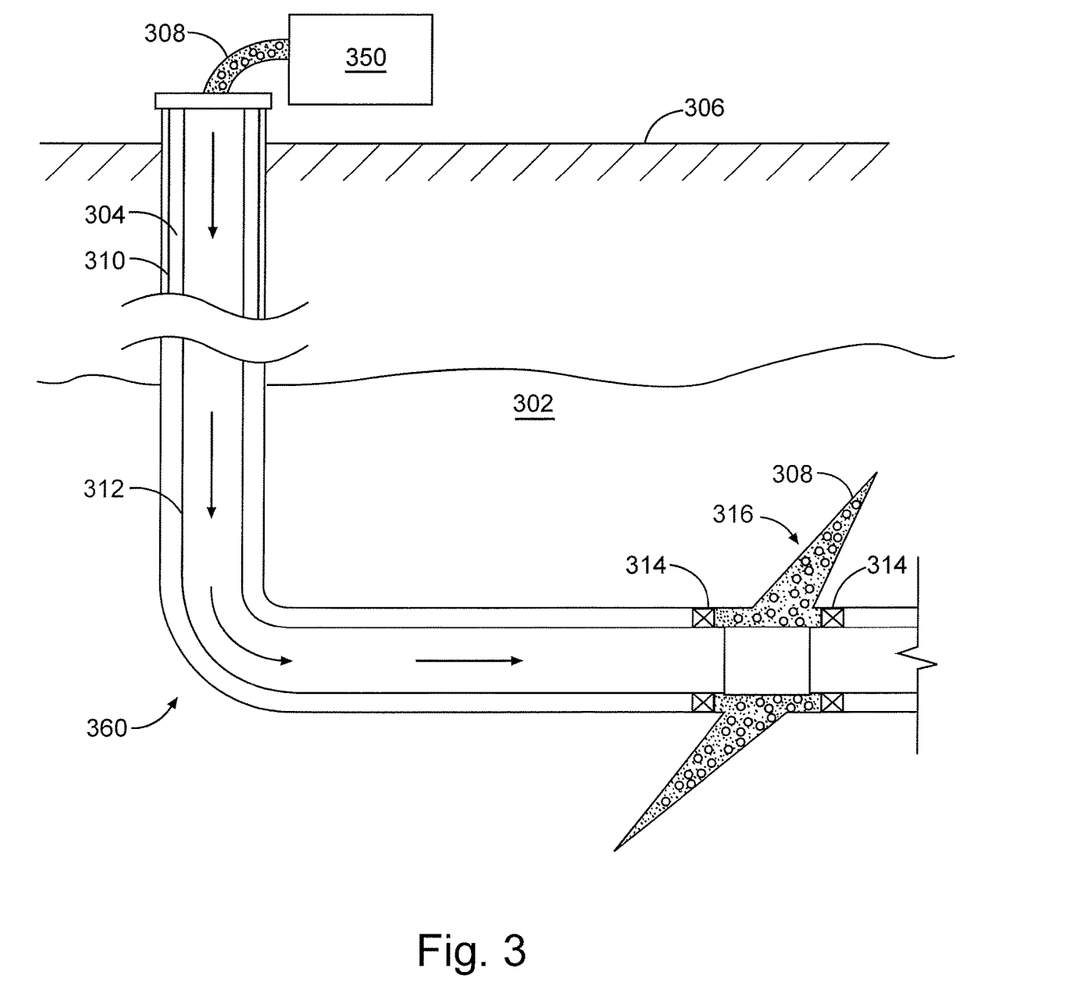
FIG. 3 is a diagram illustrating an example of a subterranean formation in which a fracturing operation may be performed in accordance with certain embodiments of the present disclosure.

FIG. 3 shows the well 360 during a fracturing operation in a portion of a subterranean formation of interest 302 surrounding a well bore 304. The well bore 304 extends from the surface 306, and the fracturing fluid 308 is applied to a portion of the subterranean formation 302 surrounding the horizontal portion of the well bore. Although shown as vertical deviating to horizontal, the well bore 304 may include horizontal, vertical, slant, curved, and other types of well bore geometries and orientations, and the fracturing treatment may be applied to a subterranean zone surrounding any portion of the well bore. The well bore 304 can include a casing 310 that is cemented or otherwise secured to the well bore wall. The well bore 304 can be uncased or include uncased sections. Perforations can be formed in the casing 310 to allow fracturing fluids and/or other materials to flow into the subterranean formation 302. In cased wells, perforations can be formed using shape charges, a perforating gun, hydro jetting and/or other tools.

The well is shown with a work string 312 depending from the surface 306 into the well bore 304. The pump and blender system 350 is coupled a work string 312 to pump the fracturing fluid 308 into the well bore 304. The working string 312 may include coiled tubing, jointed pipe, and/or other structures that allow fluid to flow into the well bore 304. The working string 312 can include flow control devices, bypass valves, ports, and or other tools or well devices that control a flow of fluid from the interior of the working string 312 into the subterranean zone 302. For example, the working string 312 may include ports adjacent the well bore wall to communicate the fracturing fluid 308 directly into the subterranean formation 102, and/or the working string 312 may include ports that are spaced apart from the well bore wall to communicate the fracturing fluid 308 into an annulus in the well bore between the working string 312 and the well bore wall.

The working string 312 and/or the well bore 304 may include one or more sets of packers 114 that seal the annulus between the working string 312 and well bore 304 to define an interval of the well bore 304 into which the fracturing fluid 308 will be pumped. FIG. 3 shows two packers 314, one defining an uphole boundary of the interval and one defining the downhole end of the interval. When the fracturing fluid 308 is introduced into well bore 304 (e.g., in FIG. 3, the area of the well bore 304 between packers 314) at a sufficient hydraulic pressure, one or more fractures 316 may be created in the subterranean zone 302. The proppant particulates in the fracturing fluid 308 may enter the fractures 316 where they may remain after the fracturing fluid flows out of the well bore. These proppant particulates may "prop" fractures 316 such that fluids may flow more freely through the fractures 316. In certain embodiments, cationic surfactants of the present disclosure in fracturing fluid 308 may contact and dissolve one or more hydrocarbons in the fractures 316 or other areas of the formation 302 to facilitate the flow of the hydrocarbons out of formation 302 and into the well bore 304.

While not specifically illustrated herein, the disclosed methods and compositions may also directly or indirectly affect any transport or delivery equipment used to convey the compositions to the fracturing system such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLE

Example 1

Three samples of cationic surfactants according to the formula of compound 150 in FIG. 1 were synthesized (at the percent yield of active concentrations listed below), each of which comprised the following R, $R^1$, $R^2$, and $R^3$ groups listed in Table 1 below.

TABLE 1

| Sample No. | R | $R^1$ | $R^2$ | $R^3$ | Active concentration |
|---|---|---|---|---|---|
| A | $C_{12}$ | $C_1$ | $C_1$ | $C_{12}$ | 80% |
| B | $C_{12}$ | n-$C_4$ | n-$C_4$ | n-$C_4$ | 79% |
| C | $C_{12}$ | $C_2$ | $C_2$ | $C_2$ | 75% |

Figure 4:
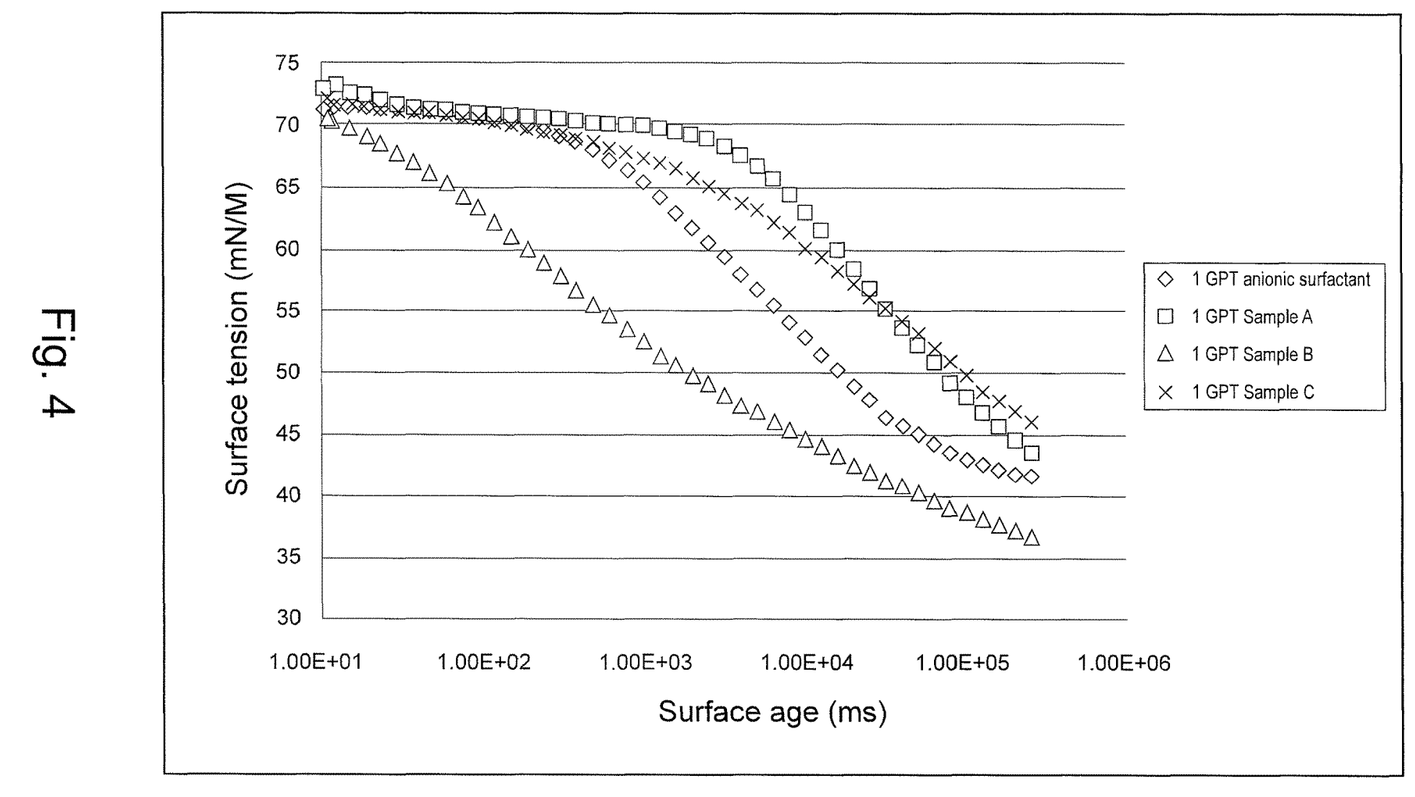
FIG. 4 is a graph illustrating data relating to the dynamic surface tension of fluids comprising certain cationic surfactants of the present disclosure.

The ability of each of these surfactants to reduce surface tension was then evaluated in a standard laboratory test using the maximum bubble pressure method in an aqueous fluid at concentrations of 1 gallons per thousand gallons of fluid (GPT). A sample comprising a commercially-available anionic surfactant was also evaluated using the same test for comparison. The dynamic surface tension measured as a function of time for each of these samples is shown in FIG. 4. As shown in this experiment, in certain embodiments, the surfactants of the present disclosure may be able to reduce surface tension in a fluid.

Example 2

In this example, core samples and oil samples were collected from two different well sites and oil recovery tests were conducted by injecting the core samples saturated with a known amount of the oil sample from each location with an aqueous 4% KCl treatment solution comprising one of the following: (a) 3 GPT of the cationic surfactant from Sample B in Example 1; (b) 3 GPT of a commercially-available anionic surfactant; or (c) 3 GPT of Arquad® T-50 cationic surfactant commercially available from AkzoNobel N.V. Two passes of each treatment solution were injected through the cores at 180° F., and the percentage of oil recovered from each core after the second pass was measured and reported in Tables 2 and 3 below. As shown in this experiment, in certain embodiments, the surfactants of the present disclosure may enhance oil recovery as compared to other known surfactants.

TABLE 2

| Core Sample #1 | |
|---|---|
| Surfactant | % Oil Recovery |
| Sample B | 8.0 |
| anionic surfactant | 4.6 |
| Arquad ® T-50 | 2.9 |

TABLE 3

Core Sample #2

| Surfactant | % Oil Recovery |
| --- | --- |
| Sample B | 6.19 |
| anionic surfactant | 1.07 |

An embodiment of the present disclosure is a method comprising: providing a treatment fluid comprising a carrier fluid and a cationic surfactant comprising at least two hydrophobic heads that each comprise a quaternary cationic moiety; and introducing the treatment fluid into at least a portion of a subterranean formation.

Another embodiment of the present disclosure is a system comprising: providing a fracturing fluid comprising an aqueous fluid and a cationic surfactant comprising at least two hydrophobic heads that each comprise a quaternary cationic moiety; and introducing the fracturing fluid into a well bore penetrating at least a portion of a subterranean formation at a pressure sufficient to create or enhance at least one fracture in at least a portion of the subterranean formation.

Another embodiment of the present disclosure is a method comprising: providing a treatment fluid comprising a carrier fluid and a cationic surfactant comprising at least two hydrophobic heads that each comprise a quaternary cationic moiety; introducing the treatment fluid into an injection well penetrating at least a portion of a subterranean formation wherein one or more hydrocarbons reside; allowing at least a portion of the hydrocarbons to dissolve in the treatment fluid; and allowing the hydrocarbons to flow out of the subterranean formation with at least a portion of the treatment fluid through a producing well that penetrates at least a portion of the subterranean formation.

Another embodiment may include a method according to any of the foregoing embodiments wherein the cationic surfactant comprises at least one compound having the following molecular structure:

wherein: each of $R^1$, $R^2$, and $R^3$ is a functional group selected from the group consisting of an alkyl group, an alkenyl group, an alkynyl group, an aryl group, an arylalkyl group, an arylalkenyl group, an alkylaryl group, an alkenylaryl group, a glycol, and any combination thereof; each of X and X' is an anion selected from the group consisting of a halide, a carboxylate, a sulfate, an organic sulfonate, a hydroxide, and any combination thereof; and R is a functional group selected from the group consisting of an alkyl group, an alkenyl group, an alkynyl group, an aryl group, and any combination thereof.

Another embodiment may include a method according to any of the foregoing embodiments wherein the carrier fluid comprises an aqueous fluid.

Another embodiment may include a method according to any of the foregoing embodiments wherein the treatment fluid is introduced into a well bore penetrating at least a portion of the subterranean formation.

Another embodiment may include a method according to any of the foregoing embodiments wherein the well bore comprises an injection well.

Another embodiment may include a method according to any of the foregoing embodiments wherein one or more hydrocarbons reside in the portion of the subterranean formation, and the method further comprises: allowing at least a portion of the hydrocarbons to dissolve in the treatment fluid; and allowing the hydrocarbons to flow out of the subterranean formation with at least a portion of the treatment fluid.

Another embodiment may include a method according to any of the foregoing embodiments wherein the subterranean formation comprises an unconventional formation.

Another embodiment may include a method according to any of the foregoing embodiments wherein the treatment fluid further comprises one or more additional surfactants.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid comprising a carrier fluid and a cationic surfactant comprising at least two hydrophobic heads that each comprise a quaternary cationic moiety, wherein the cationic surfactant comprises at least one compound having the following molecular structure:

wherein:
   each of $R^1$, $R^2$, and $R^3$ is a $C_3$ to $C_8$ hydrocarbon chain, wherein at least one of $R^1$, $R^2$, and $R^3$ is a $C_5$ to $C_7$ hydrocarbon chain; and
   each of X and X' is an anion selected from the group consisting of a halide, a carboxylate, a sulfate, an organic sulfonate, a hydroxide, and any combination thereof; and
   R is a functional group selected from the group consisting of an alkyl group, an alkenyl group, an alkynyl group, an aryl group, and any combination thereof; and
   introducing the treatment fluid into at least a portion of a subterranean formation.

2. The method of claim 1 wherein the carrier fluid comprises an aqueous fluid.

3. The method of claim 1 wherein the treatment fluid is introduced into a well bore penetrating at least a portion of the subterranean formation at a pressure sufficient to create or enhance one or more fractures in the subterranean formation.

4. The method of claim 3 wherein the well bore comprises an injection well.

5. The method of claim 1 wherein one or more hydrocarbons reside in the portion of the subterranean formation, and the method further comprises:
   allowing at least a portion of the hydrocarbons to dissolve in the treatment fluid; and
   allowing the hydrocarbons to flow out of the subterranean formation with at least a portion of the treatment fluid.

6. The method of claim 1 wherein the subterranean formation comprises an unconventional formation.

7. The method of claim 1 wherein the treatment fluid further comprises one or more additional surfactants.

8. The method of claim 1 wherein R is a $C_{13}$ to $C_{20}$ hydrocarbon chain.

9. The method of claim 1 wherein the cationic surfactant is present in the treatment fluid in an amount of from about 100 parts per million to about 100,000 parts per million of the treatment fluid by volume.

\* \* \* \* \*